United States Patent
Venkatesan

(10) Patent No.: US 9,671,841 B2
(45) Date of Patent: Jun. 6, 2017

(54) SYSTEM AND METHOD FOR TEMPERATURE MANAGEMENT OF INFORMATION HANDLING SYSTEMS

(71) Applicant: Dell Products L.P., Round Rock, TX (US)

(72) Inventor: Shathish Muthu Venkatesan, Vellore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 585 days.

(21) Appl. No.: 14/275,747

(22) Filed: May 12, 2014

(65) Prior Publication Data

US 2015/0323940 A1    Nov. 12, 2015

(51) Int. Cl.
*G06F 1/20* (2006.01)
*G06F 11/30* (2006.01)
*G05D 23/19* (2006.01)

(52) U.S. Cl.
CPC ......... *G06F 1/206* (2013.01); *G05D 23/1917* (2013.01); *G06F 1/20* (2013.01); *G06F 11/3058* (2013.01)

(58) Field of Classification Search
None
See application file for complete search history.

(56) References Cited

U.S. PATENT DOCUMENTS

| | | |
|---|---|---|
| 8,140,868 B2 | 3/2012 | Felter et al. |
| 2006/0106503 A1* | 5/2006 | Lamb ..................... H02J 3/14 700/299 |
| 2007/0286222 A1 | 12/2007 | Balasubramanian |
| 2008/0101230 A1 | 5/2008 | Liu et al. |
| 2008/0270622 A1 | 10/2008 | Gupta et al. |
| 2011/0022859 A1 | 1/2011 | More et al. |
| 2012/0063353 A1 | 3/2012 | Schlenk et al. |
| 2013/0003559 A1 | 1/2013 | Matthews |

* cited by examiner

*Primary Examiner* — Qing Wu
(74) *Attorney, Agent, or Firm* — Haynes and Boone, LLP

(57) ABSTRACT

A system and method for temperature management of information handling systems includes network switching device including a control unit, one or more ports coupled to the control unit and configured to couple the switch to a network, one or more tables stored in a memory coupled to the control unit, and a thermal sensor coupled to the control unit. The one or more tables include information associating each of the one or more ports with one or more threshold temperatures. The switch is configured to measure a temperature of the switch by the thermal sensor, compare the temperature with the one or more threshold temperatures, and adjust an operating state of the one of more ports based on the temperature and the one or more threshold temperatures. The network switching device may be a switch, a member of a stacked switch, a router, a bridge, a hub, and/or the like.

20 Claims, 7 Drawing Sheets

| Priority (High to low)/ Tier | Ports |
|---|---|
| 1 | 141, 149 |
| 2 | 142, 150 |
| 3 | 143 |
| 4 | 144 |
| 5 | 145 |
| 6 | 146 |
| ... | ... |
| n-1 | n-1 |
| n | n |

SYSTEM AND METHOD FOR TEMPERATURE MANAGEMENT OF INFORMATION HANDLING SYSTEMS

BACKGROUND

The present disclosure relates generally to information handling systems, and more particularly to temperature management of information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network switch to a destination system or second network switch. Due to the size, complexity, and dynamic nature of these networks, sophisticated network switching products are often required to continuously make routing and/or forwarding decisions and to update routing and/or forwarding information as network configurations change. In many cases, a temperature status may be monitored at a network switching device (switch), and the switch and/or the IHS may be automatically shut down when the temperature is higher than a predetermined cut-off temperature to provide system protection. However, the automatic system shut-down may cause various problems, such as network outage, a stack split when the switch is part of a stacked switch, and/or the like. The user may lose management of the network system until the network system reboots. This may be a time consuming and laborious process.

Accordingly, it would be desirable to provide improved systems and methods for temperature management of the network switching devices and the IHS.

SUMMARY

According to one embodiment, a network switching device includes a control unit, one or more ports coupled to the control unit and configured to couple the switch to a network, one or more tables stored in a memory coupled to the control unit, and a thermal sensor coupled to the control unit. The one or more tables include information associating each of the one or more ports with one or more threshold temperatures. The switch is configured to measure a temperature of the switch by the thermal sensor, compare the temperature with the one or more threshold temperatures, and adjust an operating state of the one of more ports based on the temperature and the one or more threshold temperatures.

According to another embodiment, a method for managing a network switching device includes receiving information associating each of one or more ports of the network switching device with one or more threshold temperatures, measuring a temperature of the network switching device, comparing the temperature with the one or more threshold temperatures, and changing an operating state of a first port from the one or more ports associated with a shut-down temperature from the one or more threshold temperatures to down when the temperature is higher than the shut-down temperature. The first port has a lowest priority from among the one or more ports associated with the shut-down temperature.

According to yet another embodiment, an information handling system includes a network switching device. The network switching device includes a control unit, a thermal sensor coupled to the control unit, one or more ports coupled to the control unit, and one or more tables stored in a memory coupled to the control unit. The one or more tables include information associating each of the one or more ports with a shut-down temperature and a recovery temperature. The shut-down temperature is higher than the recovery temperature. The network switching device is configured to receive the information, measure a temperature of the switch by the thermal sensor, compare the temperature with the shut-down temperature and the recovery temperature, change an operating state of a first port from the one or more ports associated with the shut-down temperature to down when the temperature is higher than the shut-down temperature, and change the operating state of the first port from the one or more ports associated with the recovery temperature to up when the temperature is lower than the recovery temperature.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or whether the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a Personal Digital Assistant (PDA), a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
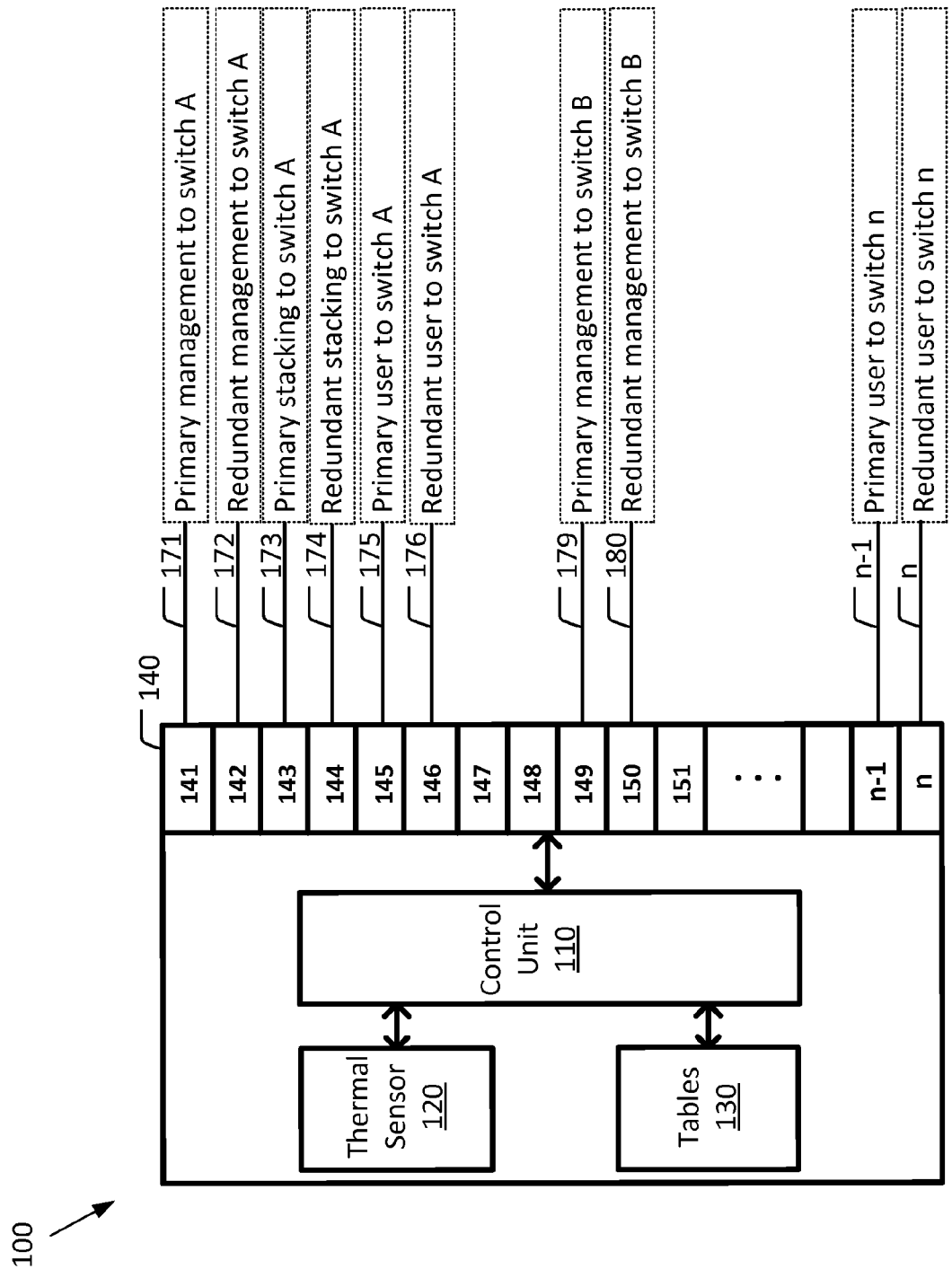
FIG. 1 is a simplified diagram showing a network switching device according to some embodiments.

FIG. 1 is a simplified diagram showing a network switching device 100 or a switch 100 according to some embodiments. In some embodiments, switch 100 may be a switch, a router, a bridge, a hub, and/or the like. Switch 100 may be used as part of a stacked switch. For example, switch 100 may be a managing switch or a member switch of the stacked switch. Switch 100 may also be a single switch configured to route and/or forward network traffic in the network.

As shown in FIG. 1, switch 100 may include a control unit 110 configured to manage and/or control the operation of switch 100. Control unit 110 may include one or more processors. The one or more processors included in control unit 110 may be any type of central processing unit, microprocessor, microcontroller, multi-core processor, field programmable gate array (FPGA), application specific integrated circuit (ASIC), and/or the like. In some examples, the one or more processors may be a virtual processor of a virtual machine and/or a virtual environment.

Switch 100 may also include a thermal sensor 120 coupled to control unit 110 and configured to measure the temperature status of switch 100. In some examples, thermal sensor 120 may include a thermistor, a thermocouple, a resistance thermometer, an infrared sensor, and/or any other suitable thermal sensor capable of monitoring the temperature status of switch 100. Thermal sensor 120 may be controlled by control unit 110, and the measuring results from thermal sensor 120 may be obtained and compared to one or more threshold temperatures, e.g., a shut-down temperature and/or a recovery temperature, by control unit 110 as discussed later in the present disclosure. The operating state, e.g., down or up, of the switch and/or one or more ports of the switch may be adjusted based on the threshold temperatures and the monitored temperature status of switch 100.

Switch 100 may also include one or more tables 130 maintained or updated by control unit 110. In some examples, the one or more tables 130 may include virtual LAN (VLAN) tables, media access control (MAC) tables, layer 3 tables, layer 3 forwarding information bases, access control lists (ACLs), flow processing (FP) tables, and/or the like. In some examples, the one or more tables 130 may also include configuration, priority/tier information, and threshold temperatures such as shut-down temperatures and recovery temperatures as discussed later in the present disclosure. The one or more tables 130 may be stored in memory coupled with control unit 110. The one or more tables 130 may be implemented using data structures other than tables and/or using databases.

As shown in FIG. 1, switch 100 may also include one or more ports 140 (e.g., ports 141-150 . . . port n−1, and port n) for coupling switch 100 using one or more corresponding network links (e.g., links 171-180, . . . link n−1, and link n) to one or more other switches (not shown) and/or one or more other networks (not shown) for transmitting and receiving network traffic. Combinations of one or more of the network links (e.g., links 171-180 . . . link n−1, and link n) may be configured as a virtual link trunking (VLT), a link aggregation group (LAG), an inter-chassis link (ICL), and/or the like. For example, link 171 and link 172 are both used for transmitting and receiving management related traffic with switch A and may be configured as a VLT, a LAG, a ICL, and/or the like.

In some examples, port 141 may be a primary management port configured to be coupled to another switch (e.g., switch A) using link 171. The primary management port may be used to receive and transmit management traffic, such as network setup, dynamic host configuration protocol (DHCP), IP ping, software defined networking (SDN), and/or the like. In some examples, port 142 may be a redundant management port configured to be coupled to switch A using link 172. In some examples, management port 142 may be considered to be redundant because management port 141 may also be used to exchange management traffic with switch A. In some examples, primary management port 141 may be assigned a higher priority than redundant management port 142 as discussed later in the present disclosure.

In some examples, port 143 may be a primary stacking port configured to be coupled to another switch (e.g., switch A) using link 173. The primary stacking port may be used to connect a plurality of switches to form a stacked switch. The plurality of switches for forming the stacked switch may share a single IP address and function as a single switching device to the external switches and/or devices. In some examples, port 144 may be a redundant stacking port configured to be coupled to switch A using link 174. In some examples, primary stacking port 143 may be assigned a higher priority than redundant stacking port 144 as discussed in the present disclosure.

In some examples, port 145 may be a primary user port configured to be coupled to another switch (e.g., switch A) using link 175. The primary user port may be used to receive and transmit various types of network traffic that may be accessible to the users. In some examples, port 146 may be a redundant user port configured to be coupled to switch A using a link 176. In some examples, port 149 may be a primary management port configured to be coupled to a switch B, and port 150 may be a redundant management port configured to be coupled to switch B. In some examples, primary user port 145 may be assigned a higher priority than redundant user port 146 as discussed in the present disclosure.

As discussed with reference to FIG. 1, control unit 110 of switch 100 may manage a thermal sensor 120 to monitor the temperature status of switch 100. In some examples, when the temperature measured by thermal sensor 120 is determined to be higher than a predetermined shut-down temperature, each of the one or more ports 140 of switch 100 may be shut down. The entire shut-down of switch 100 may have some disadvantages, for example, when switch 100 is part of a stacked switch, a stack split may occur when each of the ports of switch 100 is shut down and the stacked switch may be split into multiple different stacks. In addition, when each of the ports of switch 100 is shut down and before switch 100 is brought back, there may be a network outage. Users may lose access to the network during the network outage, and this may bring inconvenience to the users. Moreover, the abrupt shut down of switch 100 may also cause data loss.

Figure 2A:
FIG. 2A is a simplified diagram of a port configuration table according to some embodiments.

FIG. 2A is a simplified diagram of a port configuration table 200 according to some embodiments. The port configuration table 200 may be used by switch 100 and/or control unit 110 to store information regarding the configuration of the one or more ports 140 in switch 100. The port configuration table 200 may be stored in any suitable format in the one or more tables 130 of switch 100. In some embodiments, switch 100 may be provisioned by an administrator, a managing server, and/or any other system to include the port configuration information contained in port configuration table 200 in switch 100.

As shown in FIG. 2A, port configuration table 200 includes priority assignment information for each of the one or more ports. The priorities of the one or more ports may also be regarded as tiers in the present disclosure. When the temperature measured by thermal sensor 120 is higher than a predetermined shut-down temperature, instead of shutting down all the ports of switch 100, the one or more ports with lowest priorities (e.g., priority level n) may be shut down first so that the processing load, e.g., CPU workload, bandwidth, and/or the like, on the overheated switch may be reduced and the overheated switch may be cooled down. In some examples, when the switch is still over heated after a period of time, the one or more ports with the second lowest priorities (e.g., priority level n−1) may then be shut down. As overheating continues, additional ports may be shut down based on their respective priorities. Partial shut-down may provide the users with some access, e.g., management access, to the network switch so that the users may be able to check and solve the problems related to the overheating of the switch without having to reboot the switch.

In some examples as shown in FIG. 2A, because port 141 and port 149 are primary management ports configured to transmit and receive management traffic, port 141 and port 149 may be assigned the highest priority, e.g., priority 1, among all the ports of switch 100. Because port 142 and port 150 are redundant management ports configured to be coupled to switch A and switch B respectively, port 142 and port 150 may be assigned the second highest priority, e.g., priority 2. In some examples, the primary stacking port 143, the redundant stacking port 144, the primary user port 145, and the redundant user port 146 may be assigned priorities 3-6 correspondingly. It is to be understood that the priority assignments shown in FIG. 2A are merely an example and is not intended to be limiting. Any other suitable priority assignments may be possible. For example, each of the redundant ports, e.g., ports 142, 144, 146, and 150, may be assigned a lower priority than each of the primary ports, e.g., 141, 143, 145, and 149.

Figure 2B:
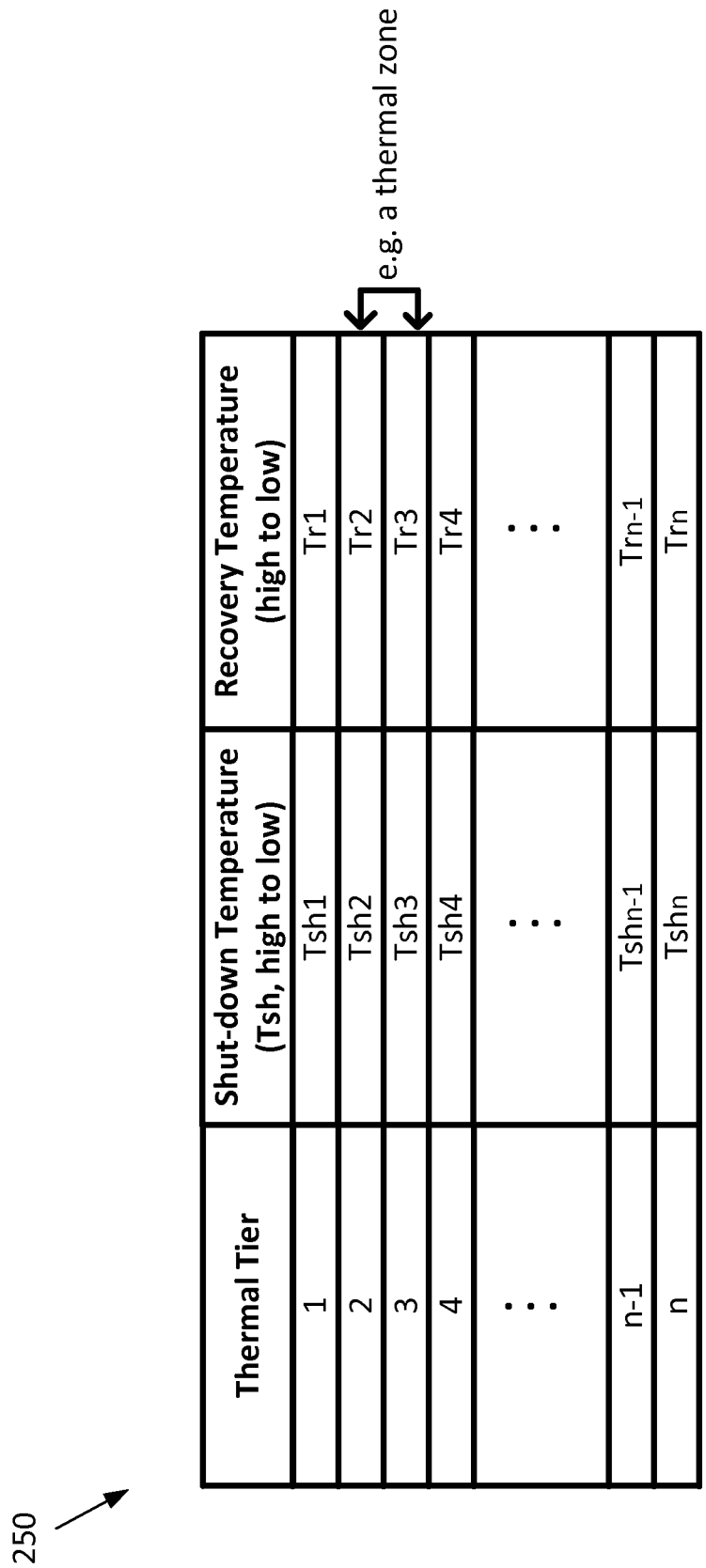
FIG. 2B is a simplified diagram of a temperature management table according to some embodiments.

FIG. 2B is a simplified diagram of a temperature management table 250 according to some embodiments. The temperature management table 250 may be used by switch 100 and/or control unit 110 to store information associating predetermined thermal tiers with the threshold temperatures, e.g., shut-down temperatures (e.g., tier 1 shut-down temperature Tsh1 to tier n shut-down temperature Tshn) and/or recovery temperatures (e.g., tier 1 recovery temperature Tr1 to tier n recovery temperature Trn). In some embodiments, the one or more thermal tiers may correspond to the one or more priorities/tiers of the ports as discussed in FIG. 2A. For example, thermal tier 1 with Tsh1 and/or Tr1 may correspond to ports 141 and 149 of tier 1. A temperature range between two adjacent shutdown or recovery temperatures may be defined as a thermal zone. For example, the temperature range between Tshi and Tshi+1 may be defined as a shut-down thermal zone of tier i, and the temperature range between Tri and Tri+1 may be defined as a recovery thermal zone of tier i. The temperature management table 250 may be stored in any suitable format in the one or more tables 130 of switch 100. In some embodiments, switch 100 may be provisioned by an administrator, a managing server, and/or any other system to include the temperature management information such as temperature management table 250 in switch 100.

As shown in FIG. 2B, temperature management table 250 includes multiple tiers of the shut-down temperatures Tsh1-Tshn and multiple tiers of the recovery temperature Tr1-Trn. In some embodiments, temperature management table 250 may be used in combination with the port configuration table 200 by control unit 110 and/or switch 100 to identify the one or more ports with the corresponding priority level. For example, when the temperature measured by thermal sensor 120 of switch 100 is higher than a predetermined Tshn, instead of shutting down all the ports of switch 100, the one or more tier n ports with lowest priorities (e.g., priority level n) identified from port configuration table 200 may be shut down first so that the processing load of the network system may be reduced and the overheated switch may be cooled down. In some examples, when the switch is still over heated after a period of time, the one or more tier n−1 ports with the second lowest priorities (e.g., priority level n−1) may then be shut down prior to shutting down the rest of the one or more ports with higher priorities. Therefore, the one or more ports of different tiers may be determined based on the priorities as shown in FIG. 2A, and the different tiers of ports/links may be shut down sequentially based on the priorities, so that the users will have some access, e.g., management access, to the switch. This kind of partial shut-down may provide the users with some access, e.g., management access, to the network switch so that the users may be able to check and solve the problems related to the overheating of the switch without having to reboot the switch.

Tsh1-Tshn and Tr1-Trn may be predetermined. In some examples, Tsh1-Tshn may be predetermined to vary a predetermined number of degrees between adjacent tiers. For examples, Tsh1 may be 4° C. higher than Tsh2, and Tsh2 may be 4° C. higher than Tsh3, etc. Similarly, Tr1-Trn may be predetermined to vary a predetermined number of degrees between adjacent tiers. For example, Tr1 may be 4° C. higher than Tr2, and Tr2 may be 4° C. higher than Tr3, etc.

In some embodiments, the lowest shut-down temperature Tshn may be higher than the highest recovery temperature Tr1. The Tsh1-Tshn and Tr1-Trn may be determined to be in an order of: Tsh1≥Tsh2≥ . . . ≥Tshn−1≥Tshn≥Tr1≥Tr2≥ . . . ≥Trn. For example, Tsh1 may be predetermined to be 86° C., Tsh2 may be predetermined to be 82° C., and Tsh3 may be predetermined to be 78° C. Tr1 may be predetermined to be 76° C., Tr2 may be predetermined to be 72° C., and Tr3 may be predetermined to be 68° C. In some examples, Tsh1-Tshn may be predetermined to vary by a certain percentage between adjacent tiers. For example, Tsh1 may be 5% higher than Tsh2, and Tsh2 may be 5% higher than Tsh3, etc. Similarly, Tr1-Trn may be predetermined to vary by a certain percentage between adjacent tiers. For example, Tr1 may be 5% higher than Tr2, and Tr2 may be 5% higher than Tr3. The varying percentage between adjacent shut-down temperature tiers may or may not be substantially similar to that of the recovery temperature tiers.

In some embodiments, Tsh1-Tshn and Tr1-Trn may be predetermined to be in an order of: Tsh1≥Tr1≥Tsh2≥Tr2≥ . . . ≥Tshn−1≥Trn−1≥Tshn≥Trn. For example, Tsh1 may be predetermined to be 86° C., Tsh2 may be predetermined to be 82° C., and Tsh3 may be predetermined to be 78° C. Tr1 may be predetermined to be 84° C., Tr2 may be predetermined to be 80° C., and Tr3 may be predetermined to be 76° C. Tsh1-Tshn and/or Tr1-Trn may also be predetermined to vary by a certain percentage between adjacent tiers.

Figure 3:
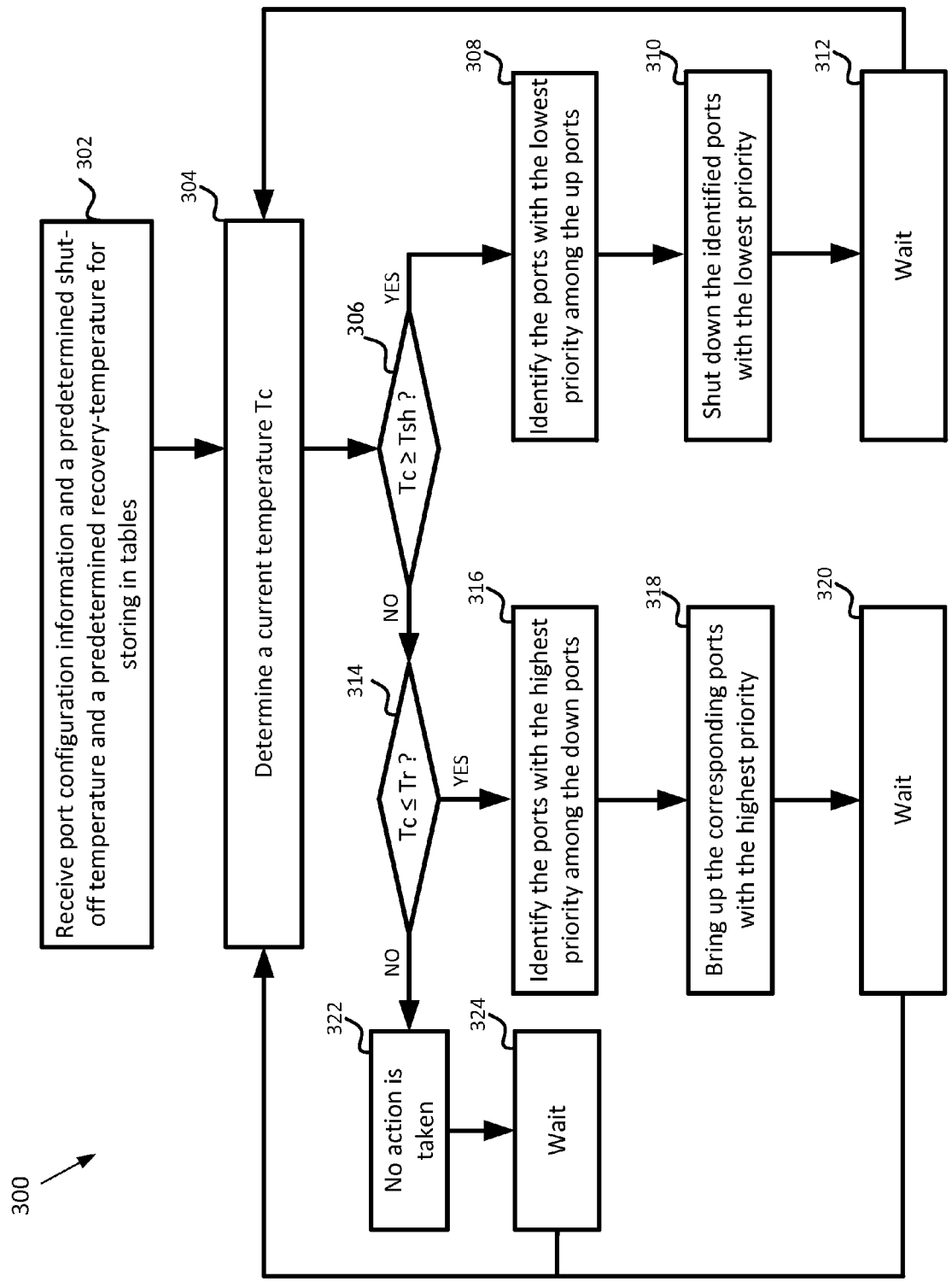
FIG. 3 is a flowchart showing a method of temperature management of a network switching device according to some embodiments.

FIG. 3 is a flowchart showing a method 300 of managing temperature status of a network switching device according to some embodiments. In some embodiments, one or more of the processes 302-324 of method 300 may be implemented, at least in part, in the form of executable code stored on non-transient, tangible, machine readable media that when run by one or more processors (e.g., the one or more processors of switch 100) may cause the one or more processors to perform one or more of the processes 302-324. In some embodiments, method 300 may be performed in a network switching device, such as switch 100.

At a process 302, port configuration information of switch may be received for storing in one or more tables of switch 100. In some embodiments, the port configuration information may be received from an administrator. In some embodiments, the port configuration information may be received from other systems. The control unit of the switch may store the received port configuration information in the one or more tables of switch 100, e.g., port configuration table 200. The port configuration information may include priorities and the corresponding ports for each priority. The one or more tables, e.g., tables 130, may be used by the control unit and/or the switch to store the port configuration information. The port configuration information may be used by the control unit to manage the one or more ports of the switch based on the priority.

Still referring to process 302, in some embodiments, a shut-down temperature (Tsh) and a recovery temperature (Tr) may also be received and stored in the one or more tables of the switch by the control unit. In some examples, the value of Tsh may be greater than the value of Tr, for example, Tsh may be predetermined to be about 80° C. Tr may be predetermined to be 70° C. In some examples, Tsh may be related to the maximum temperature of the switch or of the one or more internal components of the switch. The value of Tr may be at least lower than the value of Tsh. In some examples, the value of Tr may be determined to be in a certain percentage range, e.g., from about 70% to about 95%, of the value of Tsh.

At a process 304, a current temperature (Tc) of the switch may be determined. In some embodiments, the control unit of the switch retrieves or receives Tc measured by the thermal sensor, e.g., thermal sensor 120. In some examples, Tc may be a current temperature of the switch, a current temperature of one or more components of the switch, a current temperature that is indicative of the current thermal conditions experienced by the switch, and/or the like. In some examples, Tc determined at the process 304 may be an average temperature in the switch, the highest temperature component in the switch, and/or any other temperature of the switch that is known in the art to dictate the thermal status of the switch.

At a process 306, it is determined whether the value of Tc is equal to or greater than the value of Tsh. In some embodiments, the control unit of the switch may compare the value of Tc to the value of Tsh that may be provided in the one or more tables or some other memory structure of the switch. The control unit may then determine whether the value of Tc is greater than or equal to the value of Tsh. When it is determined that the value of Tc is greater than or equal to the value of Tsh at process 306, method 300 proceeds to a process 308 by identifying the ports with the lowest priority among the up ports. When the value of Tc is determined to be less than the value of Tsh at process 306, method 300 proceeds to a process 314 for determining whether the value of Tc is equal to or less than the value of Tr as discussed later in the present disclosure.

At a process 308, the ports of the switch with lowest priority among the ports still up may be identified. In some embodiments, the control unit of the switch may examine port configuration information stored in the one or more tables of the switch, e.g., the port configuration table. For example, the control unit of the switch may examine the port configuration table to identify the one or more ports with the lowest priority rank in the table.

At a process 310, the ports with the lowest priority identified at the process 308 may be shut down. In some examples, the identified ports may be shut down and the operating state of the identified ports becomes down. In some examples, the network links connected to the identified ports may be shut down as well. In some examples, the identified ports/links may be partially shut down, for example, even when the identified ports/links are down, they may still periodically transmit management data for one or more link management protocols, such as link layer discovery protocol (LLDP), link aggregation control protocol (LACP), and/or the like.

Referring back to FIGS. 1-2, in some exemplary embodiments, ports 141-146 and ports 149-150 may be the ports with operating state being up (the up ports). When the value of Tc measured by the thermal sensor is greater than or equal to the value of Tsh stored in the switch, the control unit may examine the port configuration table, and may identify that port 146, which is a redundant user port coupled to switch A, has the lowest priority (priority level 6). Control unit 110 may then shut down port 146 at the process 310 so that the redundant user link to switch A may be shut down to reduce the processing load and/or to reduce the switch temperature. The management traffic, stacking traffic, and the user traffic through the primary user ports/links, however, remain up in the switch.

In some examples, when ports 141-145 and ports 149-150 are the up ports, the control unit may examine the port configuration table and identify that port 145, which is a primary user port coupled to switch A, has the lowest priority (priority level 5) among the up ports. The control unit may then shut down port 145 at the process 310 so that the users may not be able to transmit and/or receive user traffic to and/or from the switch. The management ports 141 and 142 remain up so that the users may still be able to request and/or transmit management traffic to monitor the working status of the switch and/or the stacked switch. The stacking ports 143 and 144 also remain up so that the stacked switch remains up without having any stack split and/or the like.

In some examples, when the value of Tc is greater than or equal to the predetermined shut-down temperature Tsh, the control unit may identify that there are more than one port of the switch having the same lowest priority among the up ports, i.e., tiebreaker ports. For example, when ports 141-142 and ports 149-150 are the up ports, the control unit may examine the port configuration table and identify that port 142 and port 150, which are the redundant management ports coupled to switch A and switch B respectively, both have the lowest priority (priority level 2). In some examples, the control unit may then shut down each of the more than one port that have the lowest priority, e.g., both port 142 and port 150, at the process 310. In some examples, the control unit may shut down the port of the more than one tiebreaker ports that have the lowest MAC address, and/or some other tiebreaking value. In some examples, the control unit may shut down the port of the more than one tiebreaker ports that is configured to be coupled to a switch having fewer ports. For example, switch A may include fewer ports than switch B does, thus port 142 coupled to switch A may be shut down while port 150 coupled to switch B may be kept up.

At a process 312, after shutting down the identified ports with the lowest priority at the process 310, the control unit of the switch may wait for a period of time before method 300 proceeds back to process 304 by determining Tc again. The control unit may retrieve or receive the measured Tc after waiting for a period of time to check whether the switch has cooled down after shutting down the identified ports with the lowest priority at process 310. The switch may wait for a predetermined length of time at process 312, for example, from about 1 millisecond to about 1 second or more. The predetermined length of time may depend on the polling frequency of the hardware configuration.

In some examples, after shutting down one or more ports with the lowest priority among the up ports, the temperature of the switch may decrease due to the reduced processing load. Thus, Tc may be measured again at process 304 after waiting for the period of time. When the value of Tc is determined to be still greater than or equal to the value of Tsh at process 306, method 300 proceeds to processes 308 and 310 by shutting down one or more ports having the lowest priority among the rest of the up ports as discussed above in the present disclosure.

When it is determined that the value of Tc is less than the value of Tsh at process 306, method 300 proceeds to a process 314 for determining whether Tc is less than or equal to a predetermined recovery temperature Tr. At process 314, the control unit may compare the value of Tc to the value of Tr which may be provided in the one or more tables or some other memory structure of the switch. The control unit of the switch may then determine whether the value of Tc is less than or equal to the value of Tr. When it is determined that the value of Tc is less than or equal to the value of Tr at process 314, method 300 proceeds to a process 316 by identifying the ports with the highest priority among the down ports. When it is determined that the value of Tc is greater than the value of Tr at process 314, method 300 proceeds to a process 322 as discussed later in the present disclosure.

At a process 316, the ports of the switch with highest priority among the down ports may be identified. In some embodiments, the control unit may examine the port configuration information stored in the one or more tables of the switch. For example, when the value of Tc is less than or equal to the value of Tr, the control unit of the switch may examine the port configuration table to identify the one or more ports with the highest priority in the table that have been previously shut down due to high device temperatures.

At a process 318, the ports with the highest priority identified at the process 316 may be brought up. Referring back to FIGS. 1-2, in some exemplary embodiments, when Tc measured by the thermal sensor is less than or equal to Tr stored in the switch, and each of the ports 142-146 and port 150 is previously shut down, the control unit may examine the port configuration table and may identify that there are more than one port having the same highest priority among the down ports, e.g., port 142 and port 150 are tiebreakers both with priority level 2. In some examples, the control unit may then bring up each of the tiebreaking ports at the process 310. In some examples, the control unit may bring up the port of the tiebreaking ports with the highest MAC address and/or some other tiebreaking value. In some examples, the control unit may bring up the port of the tiebreaking ports that is configured to be coupled to a switch having more ports. For example, switch B may include more ports than switch A does, thus port 150 coupled to switch B may be recovered while port 142 coupled to switch A may remain down.

In some examples, ports 143-146 may be the down ports. When Tc measured by the thermal sensor is less than or equal to Tr stored in the switch, the control unit may examine the port configuration table and may identify that port 143, which is a primary stacking port coupled to switch A, has the highest priority (priority level 3) among all down ports. The control unit may then bring up port 143 at the process 318.

At a process 320, after bringing up the identified ports with the highest priority at the process 318, the control unit of the switch may wait for a period of time before method 300 proceeds back to process 304 by determining Tc again. The control unit may retrieve or receive the measured Tc after waiting for a period of time to check whether the switch temperature has increased due to the increase processing load and determine whether more ports may be brought up. The switch may wait for a predetermined length of time at process 320, for example, from about 1 millisecond to about 1 second or more. The predetermined length of time may depend on the polling frequency of the hardware configuration.

In some examples, after bringing back one or more ports with the highest priority among the down ports, the temperature of the switch may increase due to the increased processing load. Thus, Tc may be measured again at process 304 after the period of time. When the measured Tc is determined to be greater than or equal to Tsh, method 300 may proceed to processes 308-310 by shutting down one or more ports with lowest priority as discussed earlier in the present disclosure. By shutting down one or more additional ports, the processing load may be reduced so that the temperature of the switch may be reduced.

In some examples, after bringing up one or more ports with the highest priority among the down ports, the temperature Tc of the switch may not increase and may stay below Tsh. The value of Tc may then be compared to the value of Tr at process 314. When the measured Tc is determined to be less than or equal to Tr at process 314, method 300 proceeds to processes 316-318 by further bringing up one or more ports with the highest priority among the down ports.

In some examples, after bringing up one or more ports, the value of Tc may be determined to be lower than the value of Tsh but higher than Tr, method 300 may proceed to a process 322. At process 322, no action is taken and method 300 proceeds to a process 324. In some examples as shown in FIG. 2A, after waiting for a period of time at process 324, method 300 may proceed back to process 304 so that the temperature Tc of the switch may be measured again. The control unit may retrieve or receive the measured Tc after waiting for a period of time to check whether the switch temperature has increased or decreased, and determine whether more ports may be shut down or more ports may be brought up respectively. The switch may wait for a predetermined length of time at process 324, for example, from about 1 millisecond to about 1 second or more. The predetermined length of time may depend on the polling frequency of the hardware configuration. The lengths of the waiting time at process 312, process 320, and/or process 324 may or may not be substantially similar.

Figure 4B:
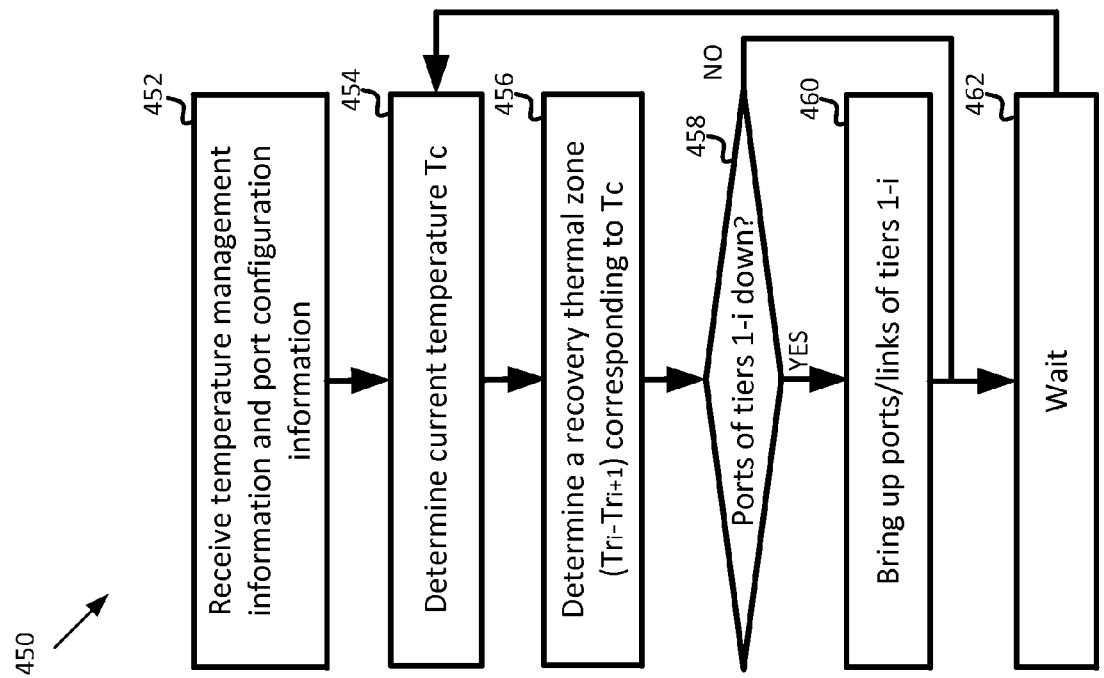
FIGS. 4A-4B are flowcharts showing methods of temperature management of a network switching device according to some embodiments.
Figure 4A:
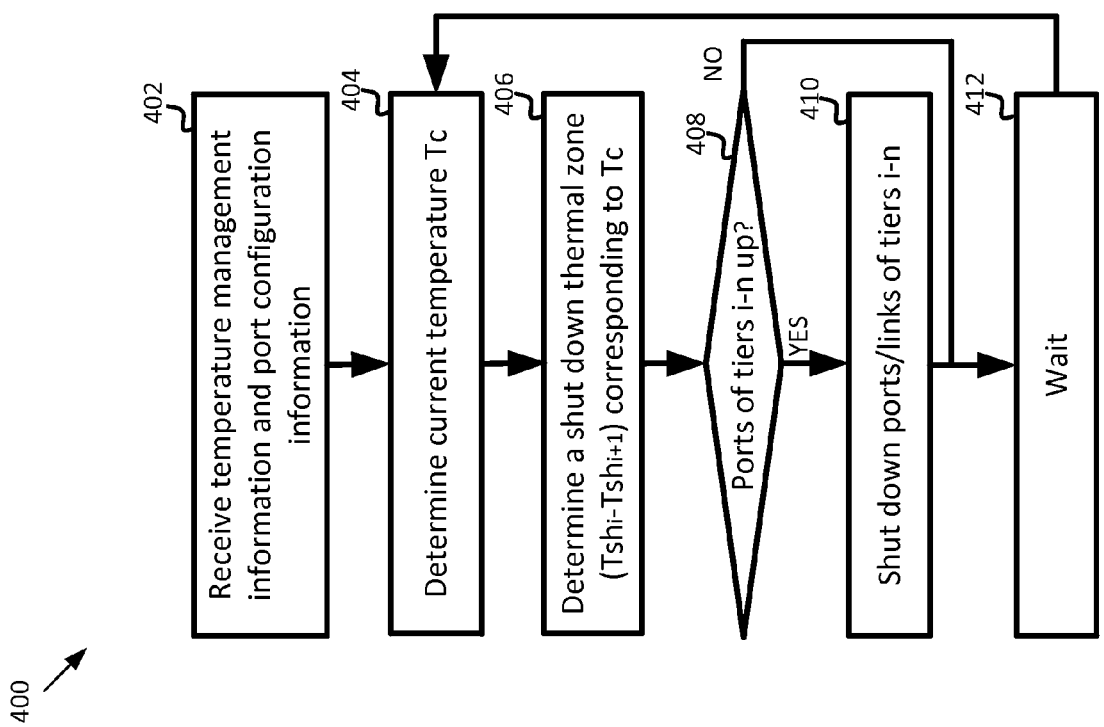

FIGS. 4A-4B are flowcharts showing methods of temperature management of a network switching device according to some embodiments. The exemplary embodiments of the tiering shut down temperatures and the tiering recovery temperatures may be shown, for example, in table 250 of FIG. 2B. In some embodiments, one or more of the processes 402-412 of method 400, and 452-462 of method 450 may be implemented, at least in part, in the form of executable code stored on non-transient, tangible, machine readable media that when run by one or more processors (e.g., the one or more processors of switch 100) may cause the one or more processors to perform one or more of the processes 402-412 and 452-462. In some embodiments, method 400 and/or method 450 may be performed in a network switching device, such as switch 100, by control unit 110. As discussed below, method 400 and method 450 will be discussed with references to FIGS. 1 and 2A-2B of the present disclosure.

FIG. 4A illustrates a method 400 of shutting down the ports of the switch using tiering shut down temperatures according to some embodiments. At a process 402, temperature management information may be received for storing in the one or more tables of the switch. In some embodiments, the temperature management information may be received from an administrator. In some embodiments, the temperature management information may be received from other systems. The control unit of the switch may store the received temperature management information in the one or more tables the switch. The temperature management information may include multiple tiers of shut-down temperatures (Tsh1-Tshn) and/or multiple tiers of recovery temperatures (Tr1-Trn). The one or more tables may be used by the control unit and/or the switch to store temperature management information. The temperature management information may be used by the control unit to manage the one or more ports of the switch based on the priorities of the ports.

At a process 404, a current temperature (Tc) of the switch may be determined. In some embodiments, the control unit of the switch retrieves or receives Tc measured by the thermal sensor. In some examples, Tc may be a current temperature of the switch, a current temperature of one or more components of the switch, and/or a current temperature that is indicative of the current thermal conditions experienced by the switch. In some examples, Tc determined at the process 404 may be an average temperature in the switch, the highest temperature component in the switch, and/or any other temperature of the switch that is known in the art to dictate the thermal status of the switch.

At a process 406, a shut-down thermal zone corresponding to the measured Tc may be determined. In some embodiments, one or more shut-down temperatures Tshi (i=1, 2, . . . , n) and one or more shut-down thermal zones (Tshi–Tshi+1) may be provided in the one or more tables or some other memory structure of the switch. The control unit may look up the one or more tables or some other memory structure to identify the shut-down thermal zone corresponding to Tc (e.g., Tshi≥Tc≥Tshi+1).

At a process 408, the corresponding tier i ports may be identified and determined whether the corresponding tier i ports are currently up. Tier i ports may be identified by the control unit by examining the port configuration information. When it is determined the tier i ports are up, method 400 proceeds to a process 410 by shutting down the corresponding ports/links with tier levels equal to or lower than the tier i, i.e., tiers i-n ports/links. After shutting down the corresponding tiers i-n ports/links, method 400 proceeds to a process 412. When the tier i ports are determined to be shut down at process 408, method 400 may proceed to a process 412.

At a process 412, after shutting down the corresponding tiers i-n ports/links, the control unit of the switch may wait for a period of time before method 400 proceeds back to process 404 by determining Tc again. The control unit may retrieve or receive the measured Tc after waiting for a period of time to check whether the switch has cooled down after shutting down the corresponding tiers i-n ports/links. The switch may wait for a predetermined length of time at process 412, for example, from about 1 millisecond to about 1 second or more. The predetermined length of time may depend on the polling frequency of the hardware configuration. In some embodiments, the processes 408-410 of method 400 may be substantially similar to the processes 308-310 of method 300.

FIG. 4B illustrates a method 450 of bringing up the ports of the switch using tiering recovery temperatures according to some embodiments. In some embodiments, processes 452-454 of method 450 may be substantially similar to processes 402-404 of method 400.

At a process 456, a recovery thermal zone corresponding to the measured Tc may be determined. In some embodiments, one or more recovery temperatures Tri (i=1, 2 . . . n) and one or more shut-down thermal zones (Tri–Tri+1) may be provided in the one or more tables or some other memory structure of the switch. The control unit may look up the one or more tables or some other memory structure to identify the recovery thermal zone corresponding to Tc (e.g., Tri≥Tc≥Tri+1).

At a process 458, the corresponding tier i ports may be identified and determined whether the corresponding tier i ports are currently down. Tier i ports may be identified by the control unit by examining the port configuration information. When it is determined the tier i ports are down, method 450 proceeds to a process 460 by bringing up the corresponding ports/links with tier levels equal to or higher than the tier i, i.e., tiers 1-i ports/links. After bringing up the corresponding tiers 1-i ports/links, method 450 proceeds to a process 462. When the tier i ports are determined to be still up at process 458, method 450 may proceed to a process 462.

At a process 462, after bringing up the corresponding tiers 1-i ports/links, the control unit of the switch may wait for a period of time before method 450 proceeds back to process 454 by determining Tc again. The control unit may retrieve or receive the measured Tc after waiting for a period of time to check whether the switch has heated up after bringing up the corresponding tiers i-n ports/links. The switch may wait for a predetermined length of time at process 462. The predetermined period of time may or may not be substantially similar to that of process 412. In some embodiments, the processes 458-460 of method 450 may be substantially similar to the processes 316-318 of method 300.

Figure 5:
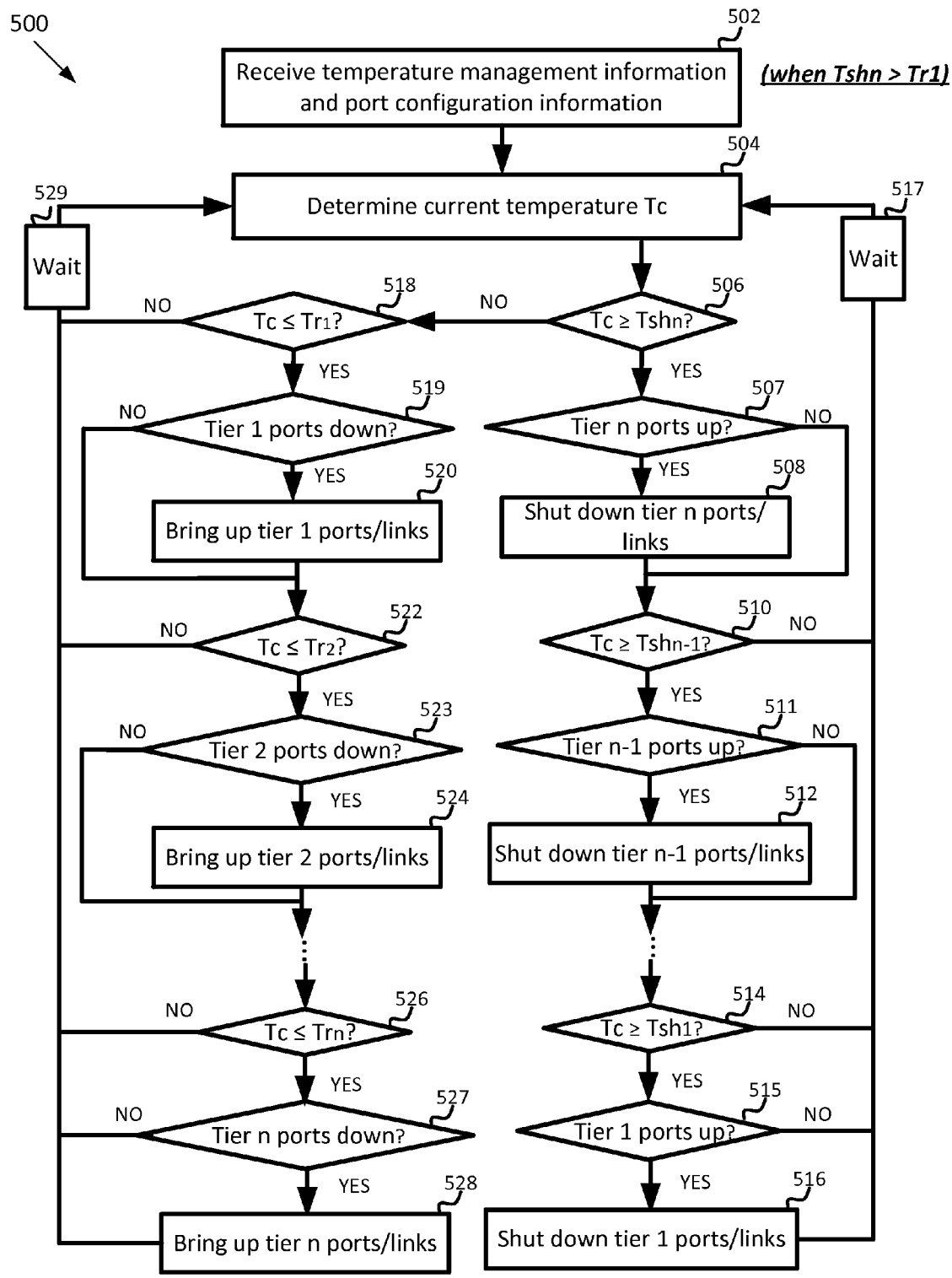
FIG. 5 is a flowchart showing a method of temperature management of a network switching device according to some embodiments.

FIG. 5 is a flowchart showing a method 500 for temperature management of switch 100 according to some embodiments. Method 500 may be an exemplary embodiment showing a combination of methods 400 and 450 for temperature management of the switch. In some embodiments for method 500, the lowest shut-down temperature Tshn may be higher than the highest recovery temperature Tr1, e.g., Tsh1≥Tsh2≥ . . . ≥Tshn−1≥Tshn≥Tr1≥Tr2≥ . . . ≥Trn. In some embodiments, one or more of the processes 502-529 of method 500 may be implemented, at least in part, in the form of executable code stored on non-transient, tangible, machine readable media that when run by one or more processors (e.g., the one or more processors of switch 100) may cause the one or more processors to perform one or more of the processes 502-529. In some embodiments, method 500 may be performed in a network switching device, such as switch 100, by control unit 110. As discussed below, method 500 of FIG. 5 will be discussed with references to FIGS. 1, 2, and 4 of the present disclosure. In some embodiments, processes 502-504 of method 500 may be substantially similar to processes 402-404 of method 400.

At a process 506, it is determined whether the value of Tc is greater than or equal to the value of Tshn. In some embodiments, Tshn may be provided in the one or more tables or some other memory structure of the switch, and the control unit may compare the values of Tc and Tshn. The control unit may then determine whether the value of Tc is greater than or equal to the value of Tshn. When it is determined that Tc is greater than or equal to Tshn at process 506, method 500 proceeds to process 507 by determining whether the corresponding tier n ports are currently up. Tier n ports may be identified by the control unit by examining the port configuration information. When it is determined the tier n ports are up, method 500 proceeds to a process 508 by shutting down the corresponding tier n ports/links. When the tier n ports are determined to be shut down at process 507, method 500 may proceed to a process 510.

At a process 510, it is then determined whether the value of Tc is greater than or equal to the value of Tshn−1. In some embodiments, Tshn−1 may be provided in the one or more tables or other memory structure of the switch, and the control unit may compare the values of Tc and Tshn−1. The control unit may then determine whether the value of Tc is greater than or equal to the value of Tshn−1. When it is determined the value of Tc is greater than or equal to the value of Tshn−1 at process 510, method 500 proceeds to a process 511 by determining whether the corresponding tier n−1 ports are up. Tier n−1 ports may be identified by the control unit by examining the port configuration information. When it is determined the tier n−1 ports are still up, method 500 proceeds to a process 512 by shutting down the corresponding tier n−1 ports/links. When the tier n−1 ports are determined to be shut down at process 511, method 500 may proceed onto a process after the process 512.

Method 500 may further proceed to compare Tc with the corresponding tier i shut-down temperature Tshi (i=1, 2, . . . , n) of different tiers as listed in the temperature management table. The control unit may identify and shut down the corresponding tier i (i=1, 2, . . . , n) ports/links. The corresponding tier i (i=1, 2, . . . , n) ports/links may be determined by the control unit by examining the port configuration information. In some embodiments, the processes 506-508, 510-512, and/or 514-516 of method 500 may be substantially similar to the processes 306-310 of method 300, except that they are limited to ports/links from a single tier rather than to all of the ports/links as a single group.

At processes 510 and 514 as shown in FIG. 5, when the value of Tc is determined to be lower than the value of the corresponding Tshi (i=1, 2, . . . , n), method 500 proceeds to a process 517 by waiting for a period of time before method 500 proceeds back to process 504 to determine Tc again. The control unit may retrieve or receive the measured Tc after waiting for a period of time to check whether the switch has cooled down after shutting down the corresponding tier ports/links. The switch may wait for a predetermined length of time at process 517, for example, from about 1 millisecond to about 1 second or more. The predetermined length of time may depend on the polling frequency of the hardware configuration. Method 500 then proceeds back to process 504 to determine Tc. The control unit may retrieve or receive the measured Tc after waiting for a period of time to check whether the switch has cooled down.

After measuring the Tc at process 504 again, method 500 proceeds to process 506. At process 506, when the value of Tc is determined to be lower than the value of Tshn, method 500 proceeds to process 518 by determining whether the value of Tc is less than or equal to the value of Tr1. Tr1 may be provided in the one or more tables or other memory structure of the switch, and the control unit may compare the values of Tc and Tr1. The control unit may then determine whether the value of Tc is less than or equal to the value of Tr1. When it is determined that the value of Tc is less than or equal to the value of Tr1 at process 518, method 500 proceeds to a process 519 by determining whether the corresponding tier 1 ports are currently down. Tier 1 ports may be identified by the control unit by examining the port configuration information. When the tier 1 ports are down, method 500 proceeds to a process 520 by bringing up the tier 1 ports/links. When the tier 1 ports are still up, method 500 may proceed to a process 522.

At process 522, it is determined whether the value of Tc is less than or equal to the value of Tr2. In some embodiments, Tr2 may be provided in the one or more tables or other memory structure of the switch, and the control unit may compare the value of Tc to the value of Tr2. The control unit may then determine whether the value of Tc is less than or equal to the value of Tr2. When it is determined that the value of Tc is less than or equal to the value of Tr2 at process 522, method 500 proceeds to a process 523 by determining whether the corresponding tier 2 ports are down. Tier 2 ports may be determined by the control unit by examining the port configuration information. When the tier 2 ports are down, method proceeds to a process 524 by bringing up the tier 2 ports/links. When the tier 2 ports are still up, method 500 may proceed to a process after the process 524.

Method 500 may further proceed to compare Tc with corresponding tier i recovery temperature Tri (i=1, 2, . . . , n) of different tiers as listed in the temperature management table. The control unit may identify and bring up the corresponding tier i (i=1, 2, . . . , n) ports/links. The corresponding tier i (i=1, 2, . . . , n) ports/links may be determined by the control unit by examining the port configuration information. The processes 518-520, 522-524, and/or 526-528 of method 500 may be substantially similar to the processes 314-318 of method 300, except that they are limited to ports/links from a single tier rather than to all of the ports/links as a single group.

At processes 518, 522, and 526 as shown in FIG. 5, when the value of Tc is determined to be greater than the corresponding Tri (e.g., i=1, 2, n), method 500 proceeds a process 529 by waiting for a period of time before method 500 proceeds back to process 504 to determine Tc again. The control unit may retrieve or receive the measured Tc after waiting for a period of time to check whether the switch has heated up after bringing up the corresponding tier ports/links. The switch may wait for a predetermined length of time at process 529, for example, from about 1 millisecond to about 1 second or more. The predetermined length of time may depend on the polling frequency of the hardware configuration. The length of the waiting time at process 517 may or may not be substantially similar to the length of the waiting time at process 529. The lengths of the waiting time at process 517 following different processes, e.g., processes 510, 514, and/or 516 may or may not be substantially similar to each other. The lengths of the waiting time at process 529 following different processes, e.g., processes 522, 526, and/or 528 may or may not be substantially similar to each other. Method 500 then proceeds back to process 504 to determine Tc. The control unit may retrieve or receive the measured Tc after waiting for a period of time to check whether the switch has heated up.

For the clarity of discussion, method 500 of FIG. 5 may be further discussed using three tiers of shut-down temperatures (Tsh1, Tsh2, and Tsh3) and three tiers of recovery temperatures (Tr1, Tr2, and Tr3), where n of FIG. 5 equals to 3. As shown in Table 1 below, Tsh1 may be predetermined to be 86° C., Tsh2 may be predetermined to be 82° C., and Tsh3 may be predetermined to be 78° C. Tr1 may be predetermined to be 76° C., Tr2 may be predetermined to be 72° C., and Tr3 may be predetermined to be 68° C.

TABLE 1

Tiers 1-3 shut-down temperatures (Tsh1-Tsh3) and recovery temperatures (Tr1-Tr3)

| | Tshi (° C.) | Tri (° C.) |
|---|---|---|
| i = 1 | 86 | 76 |
| i = 2 | 82 | 72 |
| i = 3 | 78 | 68 |

In some examples, when Tc is measured to be 83° C. at process 504, method 500 may proceed to process 506 to compare the value of Tc and the value of Tsh3 (n=3). Because Tc=83° C. is greater than Tsh3=78° C., method 500 may proceed to process 507 to identify and determine whether tier 3 ports are up. When it is determined tier 3 ports are still up, method 500 may proceed to process 508 by shutting down tier 3 ports/links. Method 500 may then proceed to process 510 to compare the value of Tc and the value of Tsh2. When it is determined tier 3 ports are down at process 507, method 500 may proceed to process 510. At process 510, because Tc=83° C. is greater than Tsh2=82° C., method 500 may proceed to process 511 to identify and determine whether tier 2 ports are up. When it is determined tier 2 ports are still up, method 500 may proceed to process 512 by shutting down tier 2 ports/links. Method 500 may then proceed to process 514 to compare Tc and Tsh1. When it is determined tier 2 ports are down at process 511, method 500 may proceed to process 514. At process 514, because Tc=83° C. is less than Tsh1=86° C., process 514 may proceed to process 517 by waiting for a period of time, and may then proceed back to process 504 by measuring Tc again. In the current example because Tc is greater than the tier 3 Tsh3 and tier 2 Tsh2, tier 3 and tier 2 ports are shut down to reduce processing load of the switch and to reduce the switch temperature.

In some examples at process 504, when Tc is measured to decrease from the previous 83° C. to a current 75° C., method 500 may proceed to process 506 to compare Tc and Tsh3. Because Tc=75° C. is less than Tsh3=78° C., method 500 proceeds to process 518 by comparing Tc and Tr1. Because Tc=75° C. is less than Tr1=76° C., method 500 may proceed to process 519 to identify and determine whether tier 1 ports are down. Because tier 1 ports are still up, method 519 may proceed to process 522 to compare Tc and Tr2. Because Tc=75° C. is greater than Tr2=72° C., method 500 may proceed to a process 529 by waiting for a period of time, and may then proceed back to process 504 by measuring Tc again. In the current example because Tc is still greater than the tier 2 recovery temperature Tr2, tier 3 and tier 2 ports are kept down to further reduce the switch temperature.

In some examples at process 504, when Tc is measured to further decrease from 75° C. to 71° C., method 500 may proceed to process 506 to compare Tc and Tsh3. Because Tc=71° C. is less than Tsh3=78° C., method 500 proceeds to process 518 by compare Tc and Tr1. Because Tc=71° C. is less than Tr1=76° C., method 500 may proceed to process 519 to identify and determine whether tier 1 ports are down. Because the tier 1 ports are still up, method 519 may proceed to process 522 to compare Tc and Tr2. Because Tc=71° C. is less than Tr2=72° C., method 500 may proceed to process 523 to identify and determine whether tier 2 ports are down. Because tier 2 ports have been shut down, method 500 may proceed to process 524 by bringing up tier 2 ports/links. Method 500 may then proceed to process 526 to compare Tc and Tr3. Because Tc=71° C. is greater than Tr3=68° C., method 500 may proceed to process 529 by waiting for a period of time, and may then proceed back to process 504 by measuring Tc again. In the current example, tier 3 ports are still down, and tier 2 ports are brought up. In some examples, the temperature of the switch may increase due to the increased processing load resulted from bringing up tier 2 ports. The control unit/switch may further measure the Tc of the switch and determine whether more ports/links (e.g., tier 2 ports or tier 1 ports) may be shut down. In some examples, the temperature of the switch may stay at around 71° C. for a period of time. In some examples, the temperature of the switch may further decrease, and after measuring the next decreased Tc, the control unit/the switch may determine whether more ports/links (e.g., tier 3 ports) may be brought up.

Figure 6:
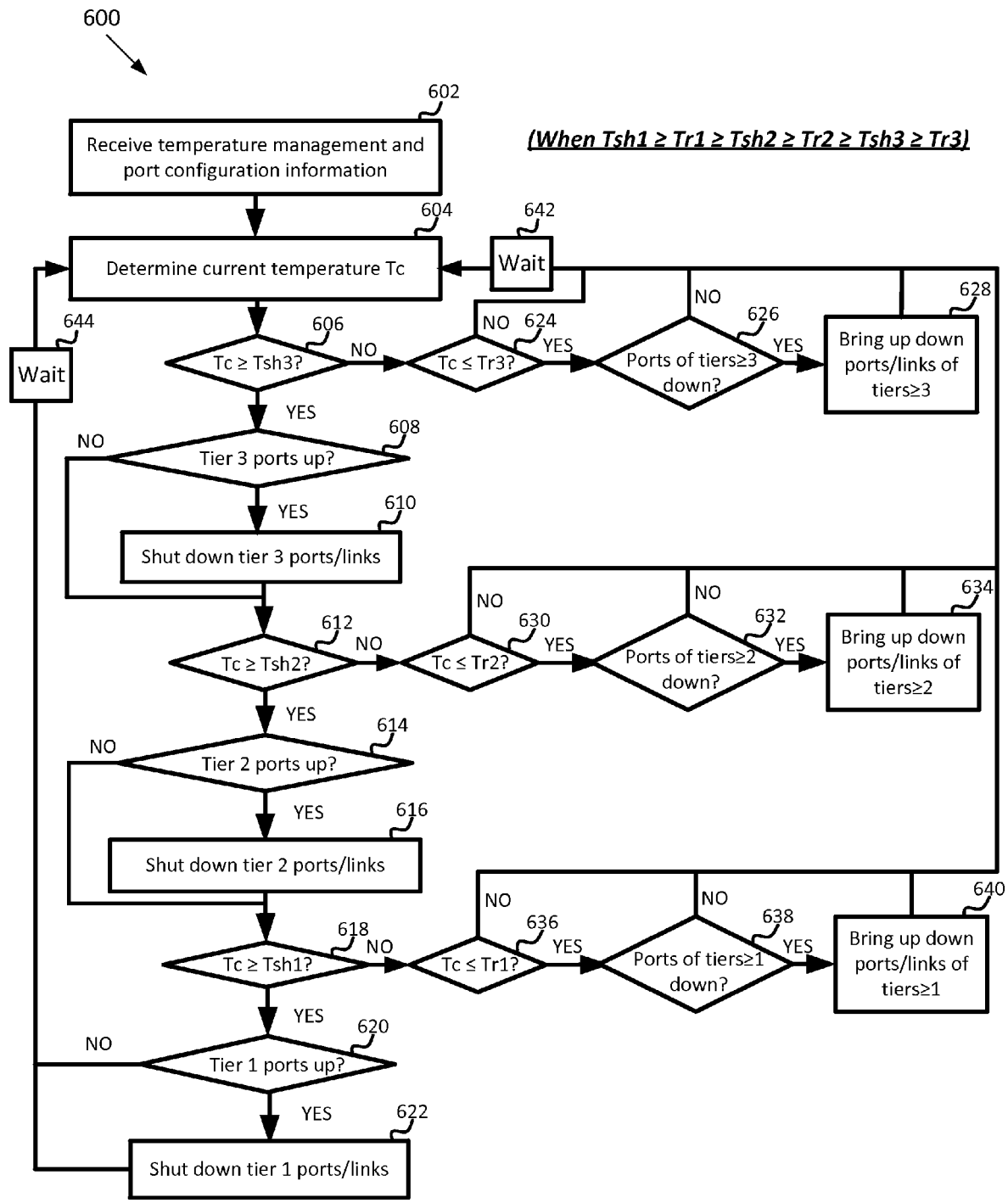
FIG. 6 is a flowchart showing another method of temperature management of a network switching device according to some embodiments.

FIG. 6 is a flowchart showing a method 600 of temperature management of switch 100 according to some embodiments. Method 600 may be an exemplary embodiment showing a combination of methods 400 and 450 for temperature management of the switch. In some embodiments for method 600, Tsh1-Tshn and Tr1-Trn may be predetermined to be in an order of: $Tsh1 \geq Tr1 \geq Tsh2 \geq Tr2 \geq \ldots \geq Tshn-1 \geq Trn-1 \geq Tshn \geq Trn$. In some embodiments, one or more of the processes 602-644 of method 600 may be implemented, at least in part, in the form of executable code stored on non-transient, tangible, machine readable media that when run by one or more processors (e.g., the one or more processors of switch 100) may cause the one or more processors to perform one or more of the processes 602-644. Processes 602-604 of method 600 may be substantially similar to processes 402-404 of method 400. Processes 606-610, 612-616, and/or 618-622 of method 600 may be substantially similar to processes 306-310 of method 300, except that they are limited to ports/links from a single tier rather than to all of the ports/links as a single group. Processes 624-628, 630-634, and/or 636-640 of method 600 may be substantially similar to processes 314-318 of method 300, except that they are limited to ports/links from a single tier rather than to all of the ports/links as a single group. The processes 642-644 of method 600 may be substantially similar to the processes 517 and 529 of method 500. In some embodiments, method 600 may be performed in a network switching device, such as switch 100. As discussed below, method 600 of FIG. 6 will be discussed with references to FIGS. 1, 2, and 4 of the present disclosure.

For the clarity of discussion, method 600 of FIG. 6 uses three tiers of shut-down temperatures (Tsh1, Tsh2, and Tsh3) and three tiers of recovery temperatures (Tr1, Tr2, and Tr3) to discuss an exemplary embodiment of the present disclosure. As shown in Table 2 below, Tsh1 may be predetermined to be 86° C., Tsh2 may be predetermined to be 82° C., and Tsh3 may be predetermined to be 78° C. Tr1 may be predetermined to be 84° C., Tr2 may be predetermined to be 80° C., and Tr3 may be predetermined to be 76° C. It is to be understood that although three-tier temperatures are discussed in FIG. 6, method 600 may be implemented in multiple tier temperatures including any appropriate number of shut-down temperatures and any appropriate number of recovery temperatures.

TABLE 2

Tiers 1-3 shut-down temperatures (Tsh1-Tsh3)
and recovery temperatures (Tr1-Tr3)

|  | Tshi (° C.) | Tri (° C.) |
|---|---|---|
| i = 1 | 86 | 84 |
| i = 2 | 82 | 80 |
| i = 3 | 78 | 76 |

In some examples, when Tc is measured to be 83° C. at process 604, method 600 may proceed to a process 606 by comparing Tc and Tsh3. Because Tc=83° C. is greater than Tsh3=78° C., method 600 may proceed to a process 608 to identify and determine whether tier 3 ports are up. When it is determined tier 3 ports are still up, method 600 may proceed to a process 610 by shutting down tier 3 ports/links. Method 600 may then proceed to a process 612 to compare Tc and Tsh2. When it is determined tier 3 ports are down at process 608, method 600 may directly proceed to process 612 to compare Tc and Tsh2. At process 612, because Tc=83° C. is also greater than Tsh2=82° C., method 600 may proceed to a process 614 to identify and determine whether tier 2 ports are up. When it is determined tier 2 ports are still up, method 600 may proceed to a process 616 by shutting down tier 2 ports/links. Method 600 may then proceed to a process 618 to compare Tc and Tsh1. When it is determined tier 2 ports are down at process 614, method 600 may proceed to process 618. At process 618, because Tc=83° C. is less than Tsh1=86° C., method 600 proceeds to a process 644 by waiting for a period of time and may then proceed back to process 604 by measuring Tc again. Because tier 3 and tier 2 ports/links are shut down, the processing load may be reduced so that the switch temperature may decrease.

In some examples at process 604, when Tc is measured to decrease from the previous 83° C. to a current 81° C., method 600 may proceed to process 606 to compare Tc and Tsh3. Because Tc=81° C. is greater than Tsh3=78° C., method 600 proceeds to process 608 to identify and determine whether tier 3 ports are up. Because tier 3 ports have been shut down, tier 3 ports are determined to be down at process 608. Method 600 may proceed to process 612 to compare Tc and Tsh2. Because Tc=81° C. is less than Tsh2=82° C., method 600 may proceed to a process 630 by comparing Tc and Tr2. Because Tc=81° C. is greater than Tr2=80° C., no ports are to be brought up. Method 600 may proceed to a process 642 by waiting for a period of time and may then proceed back to process 504 by measuring Tc. In some examples, after waiting for a period of time, the switch temperature may further decrease.

In some examples at process 604, when Tc is measured to further decrease from previously 81° C. to 79° C., method 600 may proceed to process 606 to compare Tc and Tsh3. Because Tc=79° C. is greater than Tsh3=78° C., method 600 proceeds to process 608 to identify and determine whether tier 3 ports are up. Because tier 3 ports have been shut down, tier 3 ports are determined to be down at process 608. Method 600 may proceed to process 612 to compare Tc and Tsh2. Because Tc=79° C. is less than Tsh2=82° C., method 600 may proceed to a process 630 by comparing Tc and Tr2. Because Tc=79° C. is less than Tr2=80° C., method 600 may proceed to a process 632 by identify and determining whether each of the ports having a tier level higher than or equal to tier 2, i.e., tier 1 ports and tier 2 ports, is down. Tier 2 has been shut down, while tier 1 ports are still up. Method 600 may proceed to a process 634 by bringing up the down ports with tier level higher than or equal to 2, i.e., tier 2 ports. In the current exemplary embodiment, tier 2 ports/ links may be brought up. Method 600 may then proceed to process 642 by waiting for a period of time and may then proceed back to process 504 by measuring Tc again. In some examples, the temperature of the switch may increase due to the increased processing load by bringing up the tier 2 ports. The control unit/switch may further measure the Tc of the switch and determine whether more ports/links may be shut down. In some examples, the temperature of the switch may stay at around 79° C. for a period of time. In some examples, the temperature of the switch may further decrease.

In some examples at process 604, when Tc is measured to further decrease from the previous 79° C. to a current 77° C., method 600 may proceed to process 606 to compare Tc and Tsh3. Because Tc=77° C. is less than Tsh3=78° C., method 600 may proceed to a process 624 by comparing Tc and Tr3. Because Tc=77° C. is greater than Tr3=76° C., no ports are to be brought up. Method 600 may proceed to process 642 by waiting for a period of time and may then proceed back to process 604 by measuring Tc again. In some examples, after waiting for a period of time, the switch temperature may further decrease.

In some examples at process 604, when Tc is measured to further decrease from previously 77° C. to 75° C., method 600 may proceed to process 606 to compare Tc and Tsh3. Because Tc=75° C. is less than Tsh3=78° C., method 600 may proceed to process 624 by comparing Tc and Tr3. Because Tc=75° C. is less than Tr3=76° C., method 600 may proceed to a process 626 by identifying and determining whether each of the ports higher than or equal to tier 3, i.e., tier 1 ports, tier 2 ports, and tier 3 ports, is down. Because tier 3 ports have been shut down, tier 3 ports are determined to be down at process 608. Tier 2 ports have been brought up, and tier 1 ports have been still up. Method 600 may proceed to a process 628 by recovering the down ports with tier level higher than or equal to 3. In the current exemplary embodiment, tier 3 ports/links may be brought up. Method 600 may proceed to process 642 by waiting for a period of time and may then proceed back to process 604 by measuring Tc again. In some examples, the temperature of the switch may increase due to the increased processing load by bringing up the tier 3 ports. The control unit/switch may further measure the Tc of the switch and determine whether more ports/links may be shut down. In some examples, the temperature of the switch may stay at around 75° C. for a period of time. In some examples, the temperature of the switch may further decrease.

In another exemplary embodiment, when Tc is initially measured to be 83° C. at process 604, tier 3 and tier 2 ports/links may be shut down as discussed earlier because Tc is greater than Tsh3 (78° C.) and Tsh2 (82° C.), the switch temperature may decrease from 83° C. to 75° C. when Tc is measured after waiting for a period of time. Method 600 may proceed to process 606 to compare Tc and Tsh3. Because Tc=75° C. is less than Tsh3=78° C., method 600 may proceed to process 624 by comparing Tc and Tr3. Because Tc=75° C. is less than Tr3=76° C., method 600 may proceed to a process 626 by identifying and determining whether all ports higher than or equal to tier 3, i.e., tier 1 ports, tier 2 ports, and tier 3 ports, are down. Because tier 3 ports and tier 2 ports have been shut down, tier 3 ports and tier 2 ports are determined to be down at process 608. Method 600 may proceed to process 628 by bringing up the down ports with tier level higher than or equal to 3, i.e., tier 3 ports and tier 2 ports. In the current exemplary embodiment, tier 3 and tier 2 ports/links may be brought up. Method 600 may proceed to process 642 by waiting for a period of time and may then proceed back to process 604 by measuring Tc again. In some examples, the temperature of the switch may increase due to the increased processing load by bringing up the tier 3 and tier 2 ports. The control unit/switch may further measure the Tc of the switch and determine whether more ports/links may be shut down. In some examples, the temperature of the switch may stay at around 75° C. for a period of time. In some examples, the temperature of the switch may further decrease.

It is to be understood that method 300, method 400, method 450, method 500, and/or method 600 are merely examples and are not intended to be limiting. Method 300, method 400, method 450, method 500, and/or method 600 may be combined in any appropriate format to be used by the switch. In some embodiments, the multiple tiers of shut-down temperatures as discussed in method 400, method 450, method 500, and/or method 600 may be used in combination with a predetermined recovery temperature Tr as discussed in method 300. For example, the one or more ports of the switch may be shut down in a tiering manner as shown in method 400, method 450, method 500, and/or method 600. For example, when Tc is measured to be higher than a Tshi (i=1, 2, . . . , n−1, n), the up ports with the priority level i may be shut down correspondingly. When Tc is further increased to Tshi−1 (i=1, 2, . . . , n−1, n), the up ports with the priority level i−1 may then be shut down correspondingly. After reducing the CPU workload and/or bandwidth, and Tc may reduce to below Tr, the one or more ports with the highest priority (e.g., management ports 141 and 149 of FIGS. 1-2) may be first recovered. After a period of time, control unit may retrieve the temperature status from the thermal sensor, and if Tc is still below Tr, the one or more ports with the second highest priority (e.g., redundant management ports 142 and 150 of FIGS. 1-2) may then be recovered. Therefore, the one or more down ports may be recovered in a sequence depending on the priority of the ports as shown in method 300.

In some embodiments, the one or more ports may be shut down using a predetermined shut-down temperature Tsh as discussed in method 300, and the down ports may be recovered in a tiering manner using the multiple tiers of recovery temperatures as discussed in method 400, method 450, method 500, and/or method 600. For example, when Tc is measured to be higher than Tsh, the one or more ports with the lowest priority (e.g., the redundant user port 146) may be first shut down. After a period of time, control unit may retrieve the temperature status from the thermal sensor, and if Tc is still higher than Tsh, the one or more ports with the second lowest priority (e.g., the user port 145) may then be shut down. After reducing the CPU workload and/or bandwidth, Tc may reduce to below Tsh. The one or more down ports may then be recovered using the tiering manner as shown in method 400, method 450, method 500, and/or method 600. For example, when Tc is measured to be lower than a Tri (i=1, 2, . . . , n−1, n), the down ports with the priority level i may be recovered correspondingly. When Tc is further reduced to Tri−1 (i=1, 2, . . . , n−1, n), the down ports with the priority level i−1 may then be recovered correspondingly.

In some embodiments, the length(s) of the waiting time at, for example, processes 312, 320, 322, 412, 462, 517, 529, 642, and/or 644 may have a suitable waiting time before the switch checks the temperature status again. The length of the waiting time should not be too short so that port thrashings may be avoided where ports are constantly being shut down and brought up as the temperature fluctuates. However, the length of the waiting time also should not be too long so that the switch temperature may be monitored in a timely manner. The temperature difference(s) between adjacent two tiers, e.g., tier Tshi–Tshi+1, and/or Tri–Tri+1 as shown in FIG. 2B, may also be adjusted to avoid port thrashing and also to maintain a timely monitoring of the switch. For example, once there is an overheating of the switch, the corresponding ports/links may be shut down in a timely fashion. It is to be understood that the length of the waiting time and/or the temperature difference between two adjacent tiers may be determined and/or adjusted to satisfy various application purposes, switch configurations, switch locations, and/or the like.

Some embodiments of switch 100 may include non-transient, tangible, machine readable media that include executable code that when run by one or more processors may cause the one or more processors to perform the processes of method 300, method 400, method 450, method 500, and/or method 600 as described above. Some common forms of machine readable media that may include the processes of method 300, method 400, method 450, method 500, and/or method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, the figure of the network controller is merely an example, which should not unduly limit the scope of the claims. One of ordinary skill in the art would recognize many variations, alternatives, and modifications. According to some embodiments, other architectures are possible for the network controller.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching device, the device comprising:
   a control unit;
   one or more ports coupled to the control unit and configured to couple the switch to a network;
   one or more tables stored in a memory coupled to the control unit, the one or more tables including information associating each of the one or more ports with one or more threshold temperatures; and
   a thermal sensor coupled to the control unit;
   wherein the switch is configured to
      measure a temperature of the switch by the thermal sensor;
      compare the temperature with the one or more threshold temperatures; and
      adjust an operating state of the one of more ports based on the temperature and the one or more threshold temperatures.

2. The device of claim 1, wherein:
   the one or more threshold temperatures include a shut-down temperature; and
   the switch is further configured to:
   change the operating state of a first port from the one or more ports associated with the shut-down temperature to down, when the temperature is higher than the shut-down temperature.

3. The device of claim 2, wherein the switch is further configured to:
   wait for a period of time;
   remeasure the temperature of the switch; and
   change the operating state of a second port from the one or more ports associated with the shut-down temperature to down, when the remeasured temperature is higher than the shut-down temperature.

4. The device of claim 2, wherein the first port is configured to exchange one or more management packets while the operating state of the first port is down.

5. The device of claim 2, wherein the first port has a lowest priority from among the one or more ports associated with the shut-down temperature.

6. The device of claim 5, wherein when a plurality of second ports have the lowest priority, the switch is further configured to select the first port from among the second ports based on a tiebreaker.

7. The device of claim 1, wherein:
   the one or more threshold temperatures include a shut-down temperature; and
   the switch is further configured to:
   change the operating state of each port from the one or more ports associated with the shut-down temperature to down, when the temperature is higher than the shut-down temperature.

8. The device of claim 1, wherein:
   the one or more threshold temperatures include a plurality of shut-down temperatures; and
   the switch is further configured to:
   change the operating state of each port having the operating state of up from the one or more ports associated with any of the shut-down temperatures to down, when the temperature is higher than a corresponding one of the shut-down temperatures.

9. The device of claim 1, wherein:
   the one or more tables further includes information associating each of the one or more ports with one or more priorities; and
   the switch is further configured to adjust the operating state of the one of more ports based on the one or more priorities.

10. The device of claim 1, wherein the network switching device is selected from a group consisting of a switch, a member of a stacked switch, a router, a bridge, and a hub.

11. The device of claim 1, wherein:
    the one or more threshold temperatures include a recovery temperature; and
    the switch is further configured to:
    change the operating state of a first port from the one or more ports associated with the recovery temperature to up, when the temperature is lower than the recovery temperature.

12. The device of claim 11, wherein the switch is further configured to:
    wait for a period of time;
    remeasure the temperature of the switch; and
    change the operating state of a second port from the one or more ports associated with the recovery temperature to up, when the remeasured temperature is lower than the recovery temperature.

13. The device of claim 11, wherein the first port has a highest priority from among the one or more ports associated with the recovery temperature.

14. The device of claim 1, wherein:
    the one or more threshold temperatures include a recovery temperature; and
    the switch is further configured to:
    change the operating state of each port from the one or more ports associated with the recovery temperature to up, when the temperature is lower than the recovery temperature.

15. The device of claim 1, wherein:
    the one or more threshold temperatures include a plurality of recovery temperatures; and
    the switch is further configured to:
    change the operating state of each port having the operating state of down from the one or more ports associated with any of the recovery temperatures to up, when the temperature is lower than a corresponding one of the recovery temperatures.

16. A method for managing a network switching device, the method comprising:
    receiving information associating each of one or more ports of the network switching device with one or more threshold temperatures;
    measuring a temperature of the network switching device;

comparing the temperature with the one or more threshold temperatures; and changing an operating state of a first port from the one or more ports associated with a shut-down temperature from the one or more threshold temperatures to down, when the temperature is higher than the shut-down temperature, wherein the first port has a lowest priority from among the one or more ports associated with the shut-down temperature.

17. The method of claim 16, further comprising:

changing the operating state of each port from the one or more ports associated with the shut-down temperature to down, when the temperature is higher than the shut-down temperature.

18. The method of claim 16, further comprising:

changing the operating state of a second port from the one or more ports associated with a recovery temperature from the one or more threshold temperatures to up, when the temperature is lower than the recovery temperature, wherein the second port has a highest priority from among the one or more ports associated with the recovery temperature.

19. The method of claim 16, further comprising:

changing the operating state of each port from the one or more ports associated with a recovery temperature to up, when the temperature is lower than the recovery temperature.

20. An information handling system, comprising:

a network switching device including:
  a control unit;
  a thermal sensor coupled to the control unit;
  one or more ports coupled to the control unit; and
  one or more tables stored in a memory coupled to the control unit, the one or more tables including information associating each of the one or more ports with a shut-down temperature and a recovery temperature, wherein the shut-down temperature is higher than the recovery temperature, and wherein the network switching device is configured to:
  receive the information;
  measure a temperature of the switch by the thermal sensor;
  compare the temperature with the shut-down temperature and the recovery temperature;
  change an operating state of a first port from the one or more ports associated with the shut-down temperature to down, when the temperature is higher than the shut-down temperature; and
  change the operating state of the first port from the one or more ports associated with the recovery temperature to up, when the temperature is lower than the recovery temperature.

\* \* \* \* \*